United States Patent

Kistler

[15] 3,635,298
[45] Jan. 18, 1972

[54] FORCE FEEDBACK MASS BALANCE

[72] Inventor: Walter P. Kistler, Clarence, N.Y.

[73] Assignee: Kistler Instrument Corporation, Clarence, N.Y.

[22] Filed: Feb. 24, 1970

[21] Appl. No.: 13,667

[52] U.S. Cl. .............................. 177/210, 177/255, 73/141 A
[51] Int. Cl. ......................................................... G01g 3/14
[58] Field of Search ............. 177/210, 255; 73/140 R, 141 A, 73/517 B

[56] References Cited

UNITED STATES PATENTS

| | | | |
|---|---|---|---|
| 3,196,963 | 7/1965 | Klass et al. | 177/1 |
| 3,323,372 | 6/1967 | Kistler et al. | 73/517 R |
| 3,444,743 | 5/1969 | Kistler et al. | 73/517 R |
| 3,460,382 | 8/1969 | Schultheis, Jr. | 73/141 A |
| 3,498,397 | 3/1970 | De Santo | 177/210 |
| 3,519,095 | 7/1970 | Tomes | 177/210 |

FOREIGN PATENTS OR APPLICATIONS

| | | | |
|---|---|---|---|
| 548,235 | 6/1956 | Belgium | 177/210 |

*Primary Examiner*—Richard B. Wilkinson
*Assistant Examiner*—George H. Miller, Jr.
*Attorney*—Le Blanc & Shur

[57] ABSTRACT

Disclosed is a force feedback mass balance particularly constructed for the rapid measurement of the weight of small objects. It comprises a weighing pan mounted at the upper end of a vertical rod. The rod is supported by tangential wires for movement along and about its longitudinal axis and carries a forcer coil at its other end. Movement of the rod is sensed by a capacitive pickoff which varies the current through the coil in such a direction as to oppose the movement. The magnitude of the current flow through the coil is displayed by a meter to give an indication of the weight of an object in the pan.

11 Claims, 5 Drawing Figures

PATENTED JAN 18 1972

INVENTOR
WALTER P. KISTLER

BY  LeBlanc & Shur
ATTORNEYS

FORCE FEEDBACK MASS BALANCE

This invention relates to a force feedback or servo operated mass balance for measuring the weight of small objects. The device provides rapid measurement of weight of objects in the order of 1 milligram to 20 grams and provides an electrical output signal indicative of the object weight. The principle of operation involves exactly opposing the weight of the object to be measured by the force generated by a current passing through a coil in a magnetic field. The magnitude of the coil current is indicative of the object weight.

Mass balance arrangements for weighing objects are well known. However, most of the systems of this type include supports in the form of knife edges, pivots and the like which are subject to substantial friction and wear. In many instances, the output of the device is not readily convertible into an electrical signal for indicating the weight of the object being measured.

The present invention avoids these and other difficulties by providing a force feedback mass balance which includes no knife edges, pivots or the like subject to friction and wear. As a result, the mass balance of this invention evidences a substantial increase in resolution and accuracy over known constructions.

In the present invention, the object to be weighed is placed on a pan supported by a vertical rod. The rod is suspended from a stationary support by a plurality of wires extending tangentially to a circle about the longitudinal axis of the rod. The suspension system is of the same general type as that disclosed in assignee's U.S. Pat. No. 3,323,372 and U.S. Pat. No. 3,444,743 and effectively limits movement of the rod to pure rotational movement about its longitudinal axis and pure translational movement along this same axis much in the manner of an advancing screw.

Carried by the suspended rod upon which the weight receiving pan is mounted is an annular forcer coil which is positioned to cut the flux lines of a magnetic field formed by a permanent magnet surrounding the rod. When a current is passed through the forcer coil, a force is generated on the coil which force acts through the suspended rod to oppose the weight of an object being measured and to resist any substantial movement of the rod and support pan. A capacitor plate mounted for movement with the rod cooperates with an adjacent stationary capacitor plate to form a capacitive pickoff for sensing rod movement. Any movement of the rod changes the reactance of the capacitive pickoff and this change in reactance acts through an electrical feedback loop to modify the current flowing through the forcer coil in such a direction as to restore the rod and pan to its initial position. The current flowing through the forcer coil is applied to a meter to give an indication of the weight opposing force and hence the weight of the object in the pan.

It is therefore one object of the present invention to provide an improved device for weighing objects.

Another object of the present invention is to provide an improved force feedback or servomechanism-type mass balance.

Another object of the present invention is to provide a weighing device or scale for measuring small objects which requires no mechanical suspension elements in the form of knife edges, pivots or the like which are subject to friction and wear.

Another object of the present invention is to provide a force feedback mass balance evidencing significant increases in resolution and accuracy.

Another object of the present invention is to provide a force feedback mass balance including a weighing pan suspended by a plurality of tangential wires.

These and further objects and advantages of the invention will be more apparent upon reference to the following specification, claims, and appended drawings, wherein:

Figure 1:
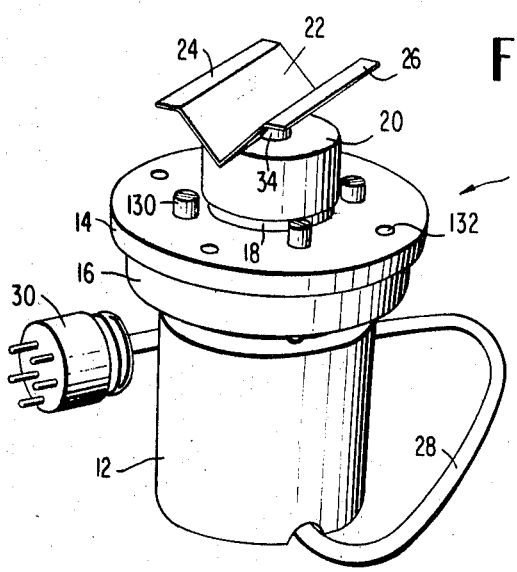
FIG. 1 is a perspective view of a force feedback mass balance constructed in accordance with the present invention.

Referring to the drawings, the novel force feedback mass balance of the present invention is generally indicated at 10 in FIG. 1 and comprises a lower portion or casing 12 spaced from an upper portion or cap 14. Attached to cap 14 and depending from it is an intermediate support block 16. Extending upwardly and formed integral with cap 14 is an annular boss 18 closed off by an annular cover 20. Positioned above cover 20 is an elongated weighing pan 22 of generally V-shaped cross section terminating in outwardly extending horizontal arms or wings 24 and 26. Balance 10 is connected through lead wires 28 to a connector 30 adapted to establish electrical communication with the feedback circuit illustrated in FIG. 5 and described in detail below.

Figure 2:
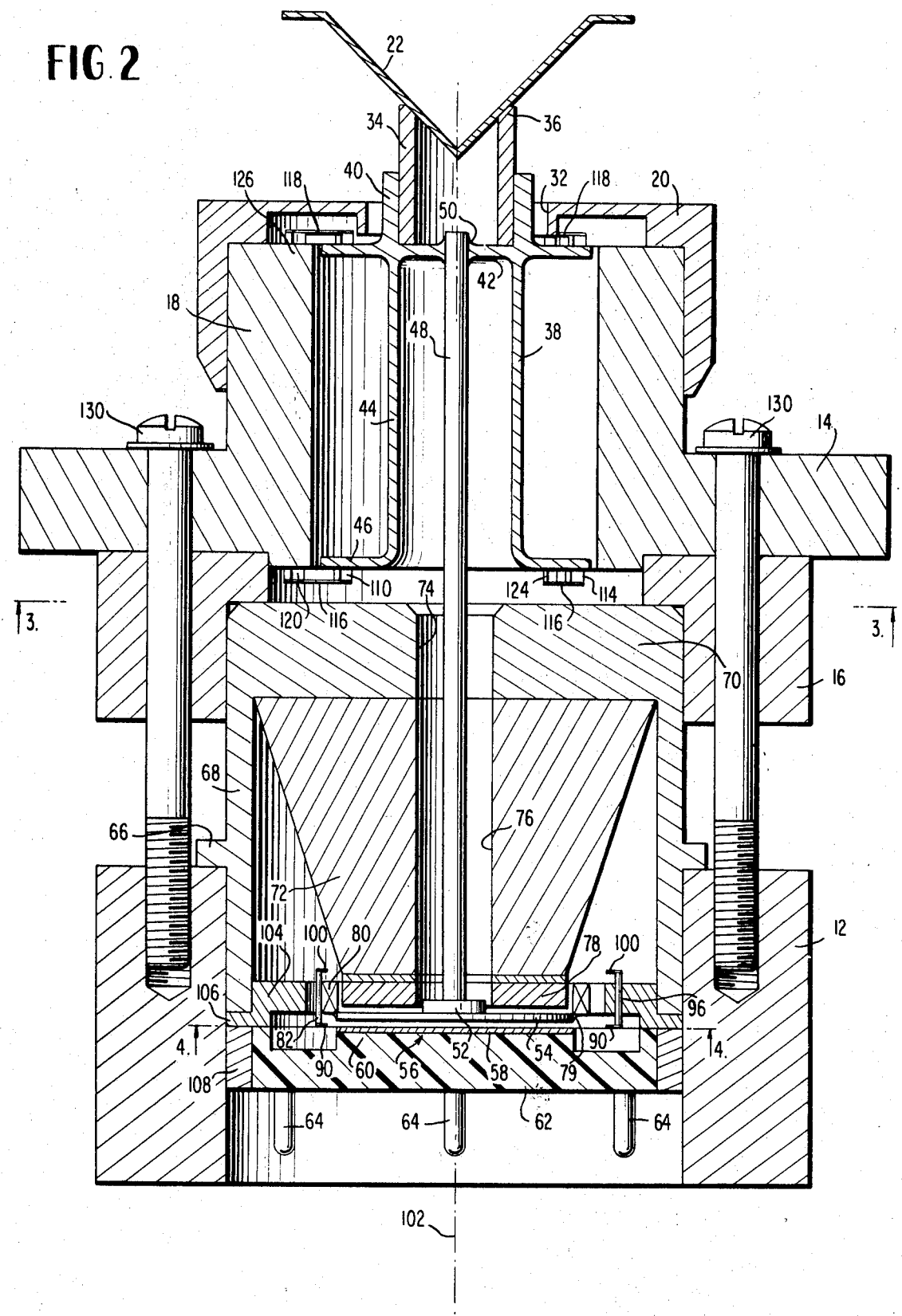
FIG. 2 is a vertical section through the mass balance of FIG. 1 showing the suspension system for the weighing pan.

Referring to FIG. 2, extending upwardly through central aperture 32 in cover 20 is a short tube 34 suitably notched at its upper end 36 to receive weighing pan 22 which it supports. The lower end of tube 34 is connected to a frame 38 comprising upper tubular section 40, transverse web 42, and lower tubular section 44 terminating in an outwardly extending annular flange 46. Upper section 40 of the frame slidably receives and is rigidly secured to tube 34 supporting pan 22. Received through a central aperture in transverse web 42 is one end of an elongated vertical rod 48 which is secured at its upper end 50 to the transverse web of the frame. Rod 48 extends downwardly where it terminates at its lower end in a bracket 52 upon which is rigidly mounted a capacitor plate 54 which forms the movable plate of a capacitive pickoff generally indicated at 56. Positioned adjacent movable plate 54 is a stationary capacitor plate 58 formed on the inside surface of a central projection 60 forming part of an electrically insulating plug 62. Plug 62 carries a plurality of connector pins 64 for establishing electrical connection to the circuitry illustrated in FIG. 5.

Clamped between support block 16 and case 12 of its annular flange 66 is a downwardly extending cup 68 formed of soft iron. Secured to the base 70 of cup 68 and received within the cup is a tapered permanent magnet 72 in the form of a truncated cone. Base 70 of cup 68 is suitably apertured as at 74 and magnet 72 is similarly provided with a central aperture 76 so that the rod 48 may pass through both the cup base and the magnet. Attached to the smaller diameter end of permanent magnet 72 is an annular magnetic pole piece 78 closely spaced from movable capacitor plate 54.

Figure 4:
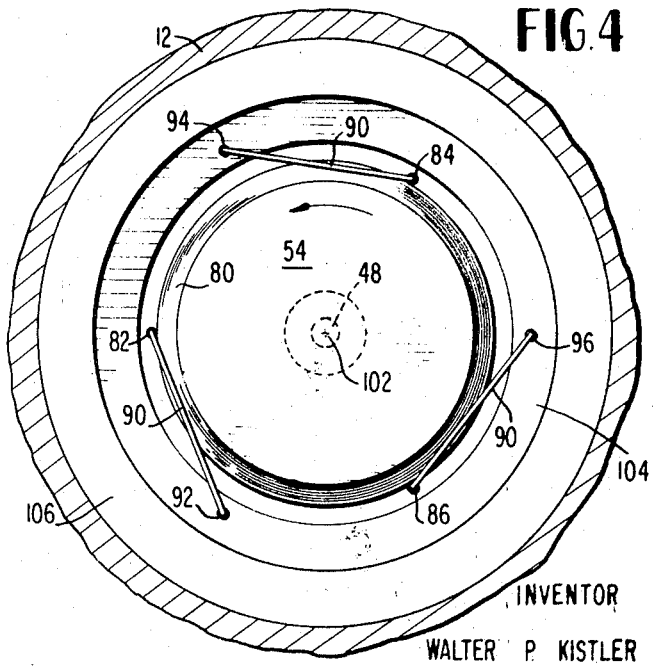
FIG. 4 is a further cross section taken along line 4—4 of FIG. 2.

Attached by epoxy or otherwise suitably secured to the outer edge of movable capacitor plate 54 is an annular forcer coil 80 formed of a plurality of windings and adapted to intercept the flux extending radially outwardly from pole piece 78 to the soft iron cup 68. Attached by epoxy or otherwise suitably secured to the outer edge of forcer coil 80 are three angularly spaced elongated posts 82, 84, and 86, preferably formed of rigid insulating material, as best illustrated in FIG. 4. These posts form the movable posts of a six-wire suspension system of the type shown and described in assignee's U.S. Pat. No. 3,444,743, issued May 20, 1969. A corresponding end of each of the posts 82, 84, and 86 is connected to the corresponding end of a similar stationary post, such as the posts 92, 94, and 96 of FIG. 4, by suspension wires 90. The opposite ends of the respective stationary and movable posts are similarly connected by a set of three wires 100, which as with the wires 90 are tangential to a circle about the longitudinal axis 102 of rod 48. Thus, the forcer coil 80 is supported by three stationary posts and three movable posts which cooperate with six tangential wires to form three parallelogram suspension subassemblies. Each of the parallelograms preferably lies in a plane parallel to the axis 102 in a manner more fully shown and described in U.S. Pat. No. 3,444,743. The rigid posts are secured to and pass through an annular support ring 104 having an outer annular flange 106 tightly clamped between the end of cup 68 and a retainer ring 108 surrounding insulating plug 62 and secured to the inner wall of casing 12.

Figure 3:
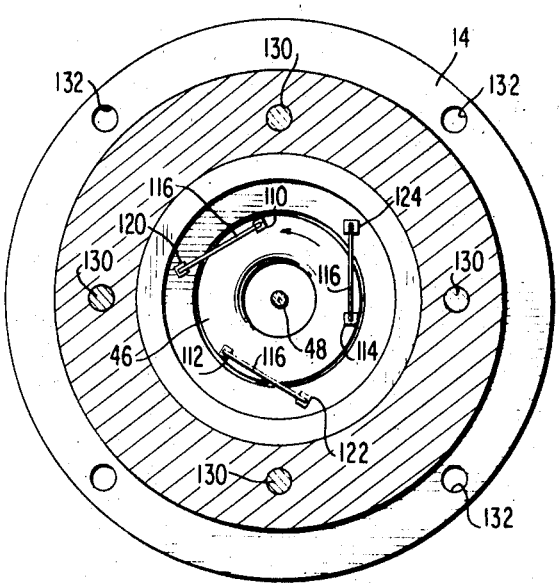
FIG. 3 is a cross section through the mass balance taken along line 3—3 of FIG. 2.

Frame 38 is similarly mounted by a tangential suspension system. More particularly, annular flange 46 at the lower end of the frame carries three mounting blocks 110, 112, and 114, as best seen in FIG. 3, which are connected by tangential wires 116 to corresponding mounting blocks 120, 122, and 124, attached to cap 14. Similar tangential wires 118 and mounting blocks suspend transverse web 42 of the frame to the upper end 126 of boss 18. As with the forcer coil suspension previously described, the tangential wires 116 and 118 all extend tangential to a circle about the longitudinal axis 102 of support rod 48 and limit the movement of the frame and support rod to purely rotational movement about this axis and translational movement along it in a manner more fully shown and described in U.S. Pat. No. 3,323,372. Preferably, the suspension wires 116 and 118 forming the frame suspension assembly are parallel to and similar in all respects to the wires 90 and 100 forming the suspension system for the forcer coil 80, the only difference being that the frame suspension wires are supported on mounting blocks while the forcer coil suspension wires are mounted on elongated parallel posts. Since the rod 48 is supported at its upper end from frame 38 by tangential suspension wires and at its lower end from forcer coil 80 from similar tangential suspension wires, both ends of the rod move through identical purely rotational and translational paths when a weight is placed in pan 22.

Case 12 and cap 14 may be connected together in any conventional manner, such as by screws 130. The outer edge of cap 14 is preferably also provided with four equally spaced apertures 132 for mounting the mass balance on a suitable support.

Figure 5:
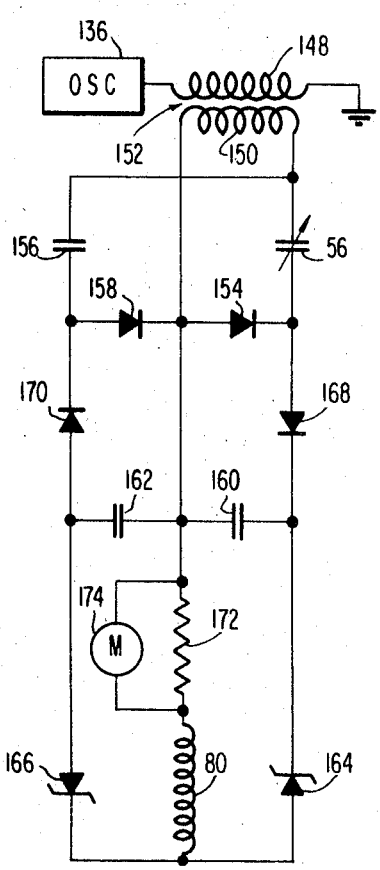
FIG. 5 is a simplified circuit diagram for the force feedback mass balance of the present invention.

FIG. 5 is a circuit diagram of the servo feedback system for the mass balance of the present invention and like parts bear like reference numerals in FIG. 5. The circuit comprises an AC electrical signal generator in the form of an oscillator 136 which supplies an electrical signal from the primary 148 to the secondary 150 of an isolating transformer 152. One side of the secondary is connected through the capacitive pickoff 56, formed by movable plate 54 and stationary capacitor plate 58 in FIG. 3, to a diode 154. This same side of secondary 150 is connected through a fixed capacitor 156 to a second diode 158. Capacitors 56 and 156 are charged from the secondary winding of transformer 152 through diodes 154 and 158. Capacitors 160 and 162 are provided to store charges delivered by capacitors 56 and 156 so that a continuous current is delivered through zener diodes 164 and 166 to the forcer coil 80. Circuit isolation is provided by the rectifier diodes 168 and 170 which act as current directors in the circuit. An output signal is developed through a load resistor 172 in series with forcer coil 80 so that the current through the load resistor and forcer coil is indicated by meter 174 connected across the load resistor.

In operation, when a weight is placed on the pan, this weight tends to drive the rod downwardly along its longitudinal axis 102. The suspension wires restrict the movement of the suspended system to pure rotation about this axis and to pure translational movement along it much in the manner of an advancing screw. Longitudinal displacement of the rod 48 in a downward direction causes the movable capacitor plate 54 to move closer to the stationary plate 52, changing the reactive impedance of the capacitive pickoff 56. This change in impedance results in a change in current flow through the forcer coil so as to increase the force acting on the coil in such a direction as to tend to restore the suspended system to its initial position. The change in current through the forcer coil changes the current flow through the series load resistor 172 which change is indicated on meter 174 giving the weight value of the object placed in pan 62. The support wires are preferably formed of electrically conductive material so that electrical connection to the forcer coil and movable capacitor plate may be completed through the support wires 90 and 100. In this case, the movable and stationary posts are preferably made of rigid electrically insulating material. The wires may typically have a rectangular cross-sectional configuration with a dimension perpendicular to the plane of the paper in FIG. 2 of approximately 0.006 inch and a dimension parallel to the longitudinal axis 102 in FIG. 2 of approximately 0.002 inch.

It is apparent from the above that the present invention provides an improved mass balance or a scale for accurately determining the weight of small objects. Important features of the invention reside in the fact that the mass balance requires no knife edges, pivots, or other support structures subject to friction and wear and at the same time provides an accurate and reliable electrical output signal indicative of the weight of the object being measured. The mass balance is particularly constructed to provide rapid measurements of the weight of small objects on the order of from 1 milligram to 20 grams and gives an output signal having increased resolution and accuracy over known constructions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A force feedback mass balance comprising an elongated rod, a frame for supporting a weighing pan mounted on said rod, a permanent magnet adjacent said rod, a forcer coil carried by said rod in the flux path of said permanent magnet, a tangential wire suspension coupled to said rod for limiting its movement to rotation about and translation along its longitudinal axis, an electrical pickoff having a portion carried by said rod, and means for feeding an electrical signal from said pickoff to said forcer coil representative of the displacement of said rod whereby said coil generates a restoring force tending to oppose movement of said rod, said frame being carried adjacent one end of said rod and said forcer coil and pickoff portion adjacent the other end of said rod, said suspension comprising at least six wires coupled to said rod and extending tangential to a circle about said longitudinal axis, at least three of said wires being located adjacent one end of said rod and at least three of said wires being located adjacent the other of said rod.

2. Apparatus according to claim 1 wherein at least three of said wires are connected to said frame by way of mounting blocks.

3. Apparatus according to claim 2 wherein at least three of said wires are connected to rigid posts secured to said forcer coil.

4. A force feedback mass balance comprising an elongated rod, a frame secured to one end of said rod, a weighing pan mounted on said frame, an annular permanent magnet surrounding a portion of said rod, a soft iron cup surrounding said permanent magnet and having a central aperture in its base through which said rod passes, said magnet and cup defining a radial airgap for the passage of flux from said magnet, an annular forcer coil mounted on the other end of the said rod and extending through said airgap, a stationary support, a pair of tangential wire suspension systems coupling said rod to said support, one of said systems comprising at least three wires connected to said frame, the other of said systems comprising at least three wires connected to said coil, and electrical pickoff having a portion carried by said rod adjacent said coil, and means for feeding an electrical signal from said pickoff to said forcer coil representative of the displacement of said rod whereby said coil generates a restoring force tending to oppose movement of said rod.

5. Apparatus according to claim 4 wherein said wires are in four sets of three each, said sets being longitudinally displaced along the length of said rod, said wires being of equal size and shape, and corresponding wires in each set lying in the same plane.

6. Apparatus according to claim 5 wherein the three wires of each set are spaced equal angles about the longitudinal axis of said rod.

7. Apparatus according to claim 4 wherein said permanent magnet tapers to a smaller dimension adjacent the open end of said cup, and a pole piece attached to the smaller end of said magnet.

8. Apparatus according to claim 7 wherein said pickoff comprises a movable capacitor plate mounted on said rod adjacent said pole piece, and a stationary capacitor plate adjacent said movable plate.

9. Apparatus according to claim 4 including a load resistor in series with said forcer coil, and a meter connecting across said load resistor for displaying the magnitude of the current flowing through said coil.

10. A force feedback mass balance comprising an elongated rod, means for supporting a weighing pan mounted on said rod, an annular permanent magnet surrounding a portion of said rod, a cup of magnetic material surrounding said permanent magnet and having a central aperture in its base through which said rod passes, said magnet and cup defining a radial airgap for the passage of flux from said magnet, an annular forcer coil mounted on said rod and extending through said airgap, a tangential wire suspension coupled to said rod for limiting its movement to rotation about and translation along its longitudinal axis, said suspension comprising at least six wires coupled to said rod and extending tangential to a circle about its longitudinal axis, at least three of said wires being located on one side of said permanent magnet and at least three of said wires being located on the other side of said permanent magnet, an electrical pickoff having a portion carried by said rod, and means for feeding an electrical signal from said pickoff to said forcer coil representative of the displacement of said rod whereby said coil generates a restoring force tending to oppose movement of said rod.

11. Apparatus according to claim 10 wherein said pickoff comprises a movable capacitor plate mounted on said rod and a stationary capacitor plate adjacent said movable plate.

* * * * *

UNITED STATES PATENT OFFICE
CERTIFICATE OF CORRECTION

Patent No. 3,635,298　　　　　　　　Dated　January 18, 1972

Inventor(s)　Walter P. Kistler

It is certified that error appears in the above-identified patent and that said Letters Patent are hereby corrected as shown below:

In Column 2, line 38, "of" should read --by--.

In Column 3, line 7, "web 42" should read --web 46--.

In Column 4, line 42, Claim 1, "other" should read --other end--; line 62, Claim 4, "and" should read --an--.

Assignment to Sundstrand Data Control, Inc., executed May 6, 1971, Recorded July 22, 1971, Reel 2748, Frame 639.

Signed and sealed this 8th day of August 1972.

(SEAL)
Attest:

EDWARD M. FLETCHER, JR.　　　　ROBERT GOTTSCHALK
Attesting Officer　　　　　　　　Commissioner of Patents